United States Patent [19]

Boldenow et al.

[11] 4,354,429
[45] Oct. 19, 1982

[54] BALE WRAPPING APPARATUS

[75] Inventors: Garry A. Boldenow, Peabody; Rex O. Weigand, Newton; Carl L. Nelms, Hesston, all of Kans.

[73] Assignee: Hesston Corporation, Hesston, Kans.

[21] Appl. No.: 108,389

[22] Filed: Dec. 31, 1979

[51] Int. Cl.³ .............................................. B65B 13/04
[52] U.S. Cl. ........................................ 100/5; 100/13; 100/88
[58] Field of Search .............................. 100/5, 13, 88

[56] References Cited
U.S. PATENT DOCUMENTS

| | | | |
|---|---|---|---|
| 3,894,484 | 7/1975 | Anstey | 100/5 |
| 4,022,120 | 5/1977 | McAllister | 100/5 |
| 4,023,479 | 5/1977 | McAllister | 100/88 X |
| 4,024,804 | 5/1977 | Hanson | 100/5 |
| 4,182,235 | 1/1980 | Harig | 100/5 X |

Primary Examiner—Billy J. Wilhite
Attorney, Agent, or Firm—Schmidt, Johnson, Hovey & Williams

[57] ABSTRACT

An improved method is provided for wrapping generally cylindrical bales of hay with twine to maintain the structural integrity thereof, in which a unique pattern of twine bindings is utilized to achieve greater strength and reliability. A related form of improved bale wrapping apparatus is also provided, in which the electrically driven twine guiding tube is electrically controlled in manner to automatically produce the pattern of bindings contemplated by the method, and which requires operator attention or control only for initiating the otherwise automatic operating cycle. The method and apparatus significantly utilize time reference techniques correlated with the known rate of rotation of the bale to produce the improved pattern of bindings and to control the production thereof automatically.

6 Claims, 3 Drawing Figures

BALE WRAPPING APPARATUS

BACKGROUND OF THE INVENTION

1. Field of the invention

This invention relates to the baling of hay or the like and, more particularly, to the wrapping of generally cylindrical bales with bindings of twine or the like for the purpose of maintaining the structural integrity of the bales upon discharge thereof from a rotary bale forming machine and thereafter during storage, transportation or handling.

The invention encompasses both an improved method of patterning and applying such bindings to bales and related, improved apparatus, including electrical cycling control means, for practicing the method in a preferred manner.

2. Description of the Prior Art

Generally cylindrical or so-called "round" bales of hay are normally formed with machines commonly referred to as "rotary balers", which typically move through a field receiving hay as it is cut into a chamber where it is rotated as it accumulates until a bale of the desired size has been formed. With bales formed in such manner, the need for some type of binding to hold the bale together in its generally cylindrical configuration after it has been discharged from the baler has been recognized from the outset. Accordingly, it has become conventional, as the final phase of formation of a bale in a rotary baler, to continue rotating the bale after it has attained essentially the desired size, while introducing to the periphery of the rotating bale the distal end stretch of a length of twine that is "picked up" by the rotating mass of hay, so that the length of twine may then be fed and guided relative to the rotating bale to form a binding around the bale in a pattern dependent upon the manner in which the twine is guided with respect to axial dimension of the rotating bale. The twine is typically fed from a container, reel or the like under appropriate tension through a guide tube whose twine dispensing extremity is shiftable along the axial dimension of the bale. U.S. Pat. No. 3,894,484 (Anstey et al.), U.S. Pat. No. 4,022,120 (McAllister), and copending application for U.S. Pat. Ser. No. 06/043,504 entitled "Interlacing Twine Wrapping Mechanism for Rotary Balers", filed Apr. 1, 1979, by Melvin V. Gaeddert which is owned by the same assignee as this invention, illustrate typical forms of rotary balers equipped with twine wrapping mechanisms.

A variety of techniques and mechanisms for controlling movement of the twine guiding tube have been tried, ranging from a simple rope tied to the guide tube to be manually pulled by a baler operator for shifting the discharge end of the guide tube along the axial dimension or "length" of the bale to surprisingly complex mechanical, electrical and even fluid powered arrangements. Those of such prior devices which have achieved any substantial acceptance as being practicable, however, have typically required the attention during wrapping of the bale of the baler operator and some continuing manual control by him over the movement of the twine guiding tube. For example, the above-mentioned U.S. Pat. No. 4,022,120 teaches movement of the guide tube by means of a reversible electric motor, which is energized to run in either direction or is deenergized by manipulation of a manual switch by the operator of the baler.

The conventional method of wrapping a bale and the result thereof may be most expeditiously explained with reference to FIG. 1, wherein a cylindrical bale wrapped in accordance with prevailing practice is illustrated in its completed form and is generally designated 10. The wrapping twine is generally designated 12 and includes a distal stretch 14 initially introduced to the bale 10 during rotation of the latter (the endmost portion of which it will be understood was "picked up" and became typically somewhat embedded in the rotating hay, so as to be obscured from view in the drawing), a relatively small number of convolutions 16 spiralled around the circumference of the bale 10 in a direction toward what is sometimes referred to as the "remote" end 18 of the bale 10, a sufficient number of convolutions 20 spiralled in the opposite direction along the length of the bale 10 to reach a point adjacent what is sometimes referred to as the "home" end 22 of the bale 10, and a terminal end stretch 24 typically hanging loosely from the bale 10 where the twine 12 was automatically cut off as the twine guide approached the end 22 of bale 10 by a mechanism normally provided for that purpose in balers provided with powered wrapping equipment. Assuming that the bale 10 will be rotating at a substantially constant rate during wrapping, the direction of spiralling of the convolutions 16, 20 will be determined by the direction in which the twine guide tube is then being moved relative to the length of the bale 10, and the spacing between adjacent convolutions 16 or 20 will be determined by the rate at which the guide tube is being so moved. It should also be noted that the twine dispensing extremity of the guide tube normally moves in an arc from a standby position directed toward the "home" end of the bale 10 but spaced outwardly from the bale 10, through a position of nearest proximity to the bale 10 while directed toward the mid-point of the latter, to a position directed toward the "remote" end of the bale 10 but spaced outwardly from the latter, and, of course, back to the mentioned standby position.

The detailed steps involved in forming the conventional pattern of binding convolutions 16, 20 shown in FIG. 1 in accordance with conventional techniques would typically include: formation of the bale 10 by the accumulation and rotation of hay while the baler is moving through the field, during which the twine guide will be in its standby position directed toward the "home" end 22 of the bale 10; action by the operator to stop the baler from further movement through the field for the purpose of wrapping the bale 10 already in the baler when it attains appropriate size, since there would be no place to put additional hay until the bale 10 has been wrapped and discharged from the baler; with the baler continuing to rotate the bale 10, action by the operator to initiate movement of the twine guide from its standby position toward the "remote" end 18 of the bale 10, in response to which the twine dispensing extremity of the twine guide swings inwardly toward the bale 10 as it is moved toward the "remote" end 18 of the bale 10 until, at a zone of the bale 10 usually somewhat beyond its mid-point, the distal stretch 14 of the twine 12 has moved into contact with and been "picked up" by the rotating hay mass of which the bale 10 is formed; the winding of the spiralled convolutions 16 upon the bale 10 as the disposition in which the twine guide is directed moves in the direction of the end 18 of the bale 10; action by the operator to reverse the direction of movement of the twine guide back toward the "home" end 22 of the bale 10, responsive to which the convolutions 20 are wound upon the bale 10; normally automatic cutting of the twine 12 at the end of the terminal stretch 24 thereof as the twine guide closely approaches its "home" position directed toward the end 22 of the bale 10; and action by the operator to stop the movement of the twine guide in its "home" or standby position. Attempts have been made to relieve the operator of the responsibility for reversing the movement of the twine guide when it reaches its fully actuated position directed toward the "remote" end 18 of the bale 10 or/and terminating movement of the twine guide when it subsequently returns to its standby position by some mechanical or electrical means such as limit switches, but such efforts have generally either resulted in undue complexity when a mechanical arrangement is employed or in objectionable impairment of reliability and increased maintenance requirements due to the adverse environment in which limit switches would have to be installed and operated.

As those skilled in the art are aware, the necessity for stopping the baler in the field during the wrapping of each bale 10 renders the wrapping operation a very critical one from the time and efficiency standpoint, and prior approaches to the problem have simply failed to provide a fully satisfactory solution involving a method utilizing automatic control to minimize both the attention and manual activity required of the operator and the period of time for completing the wrapping of each bale 10 once it has attained the proper size.

An even more serious deficiency with the conventional prior method of wrapping a bale 10, however, is the fact that the pattern of single strand bindings produced simply has proven inadequate to reasonably assure the structural integrity of bales 10 wrapped in that manner. Particularly during handling and transportation of bales 10 so wrapped, as well as even during initial discharge of the bale 10 from the baler, an intolerable number of such conventionally wrapped bales suffer breakage of one or more of the binding convolutions 16 and 20 due to the distortional forces that occur in such relatively massive bodies of hay during movement thereof or impact therewith. Thus, those skilled in the art have continued to search for a truly satisfactory method for wrapping bales of hay during rotation thereof in a rotary baler, but, insofar as we are aware, no such fully satisfactory method has heretofore been found nor suitable apparatus developed for implementing any such answer to the problem.

SUMMARY OF THE INVENTION

This invention is believed to provide a greatly improved method for wrapping bales of hay during rotation thereof in a rotary baler, as well as an essentially automatic form of preferred apparatus for practicing such improved method in optimized fashion.

The method utilizes the fact that the substantially constant speed of rotation of the bale will permit the application of individual convolutions of the wrapping to the bale in a time-referenced manner, so that an improved pattern of wrapping employing spaced zones along the length of the bale each having a plurality of substantially circumferential, adjacent convolutions interconnected by spiralled stretches of the continuous wrapping may be provided by controlling the twine guide to direct the twine on to the bale continuously through alternate time periods during which the twine guide remains directed toward a particular circumferential zone of the bale during the wrapping of a plurality of convolutions thereon and then moves along the bale laying a connected spiralled stretch thereon until the next zone of multiply convoluted wrapping is reached, with such process being repeated along the entire length of the bale. The resulting, wrapped bale is depicted in FIG. 2 and will be further described hereinafter. The improved pattern of bindings applied to the bale by the method of this invention has been found to be much more resistant to stress and impact than bales wrapped by the prior conventional method and does achieve greatly enhanced reliability in maintaining the structural integrity of the bale even under adverse conditions of storage, movement or handling thereof.

The improved apparatus of the invention, insofar as its control portions and functions are concerned, is implemented entirely with electrical components and circuitry so as to be economical, as well as reliable under conditions of field usage. The control portion of the apparatus utilizes preferably integrated circuit timer modules and a similarly implemented, electrical pulse producing module, which may be protectively packaged for field use, in conjunction with relays for accommodating the current levels required by a reversible electric motor operably coupled with the twine guide for moving the latter, in an overall arrangement which requires only manual initiation by an operator when a bale has attained the proper size for proceeding with an automatic and complete operating cycle by which the improved pattern of bindings is applied to a rotating bale on a relatively precise basis correlated with the performance of the required successive steps in an accurately time-referenced manner.

BREIF DESCRIPTION OF THE DRAWINGS

DESCRIPTION OF THE PREFERRED EMBODIMENT

Figure 2:
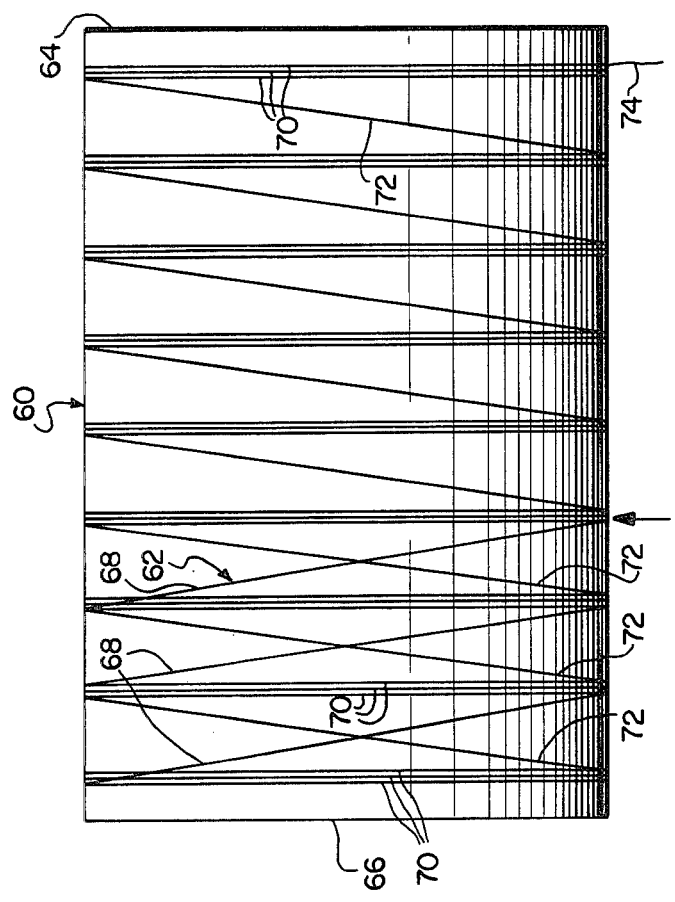
FIG. 2 is an idealized, side elevational representation of a generally cylindrical bale of hay and a typical arrangement of twine wrappings applied thereto by the improved bale wrapping method and apparatus of this invention.
Figure 1:
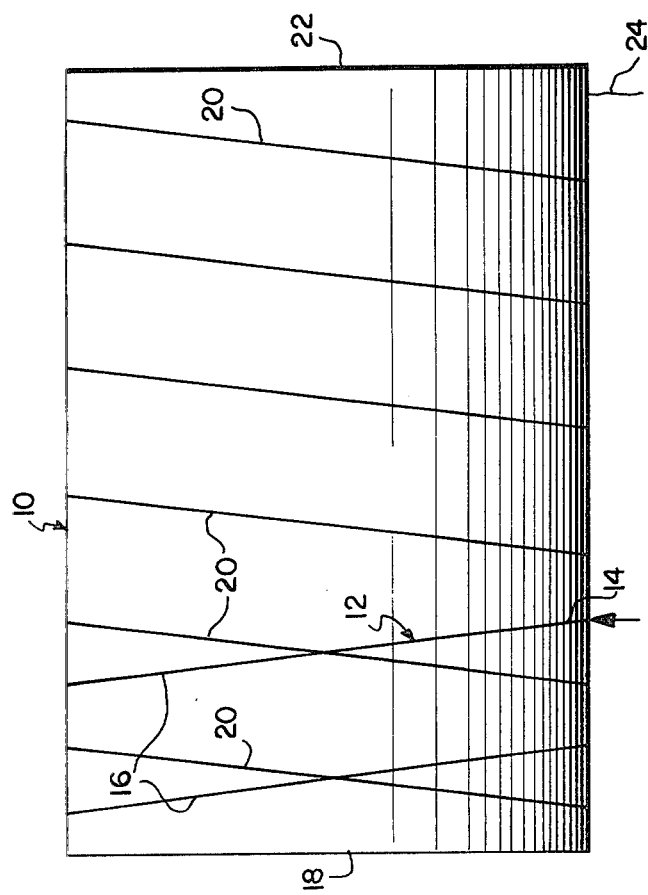
FIG. 1 is an idealized, side elevational representation of a generally cylindrical bale of hay and a typical arrangement of twine wrappings applied thereto by the conventional and most prevalent type of prior bale wrapping method and apparatus.

Although the term "hay" tends to have special and different connotations to persons in different locales, it should be understood that the method and apparatus of this invention are applicable to the formation into wrapped, generally cylindrical bales of various forms of forage and other materials, so that the term "hay", as employed both in the descriptive and claims portions hereof, is intended to generically encompass all such materials. Similarly, the term "twine" could connote to particular persons some corresponding specific type of filament utilized in their locale or for their field of application in the wrapping of cylindrically baled materials, but the term "twine", as employed both in the descriptive and claims portions hereof, is intended to be understood as referring generally to any type of filament or the like which may be employed in the wrapping of baled materials. It should also, perhaps, be noted at the outset that, although rotary balers of the mobile type for movement through a field are most common and are referred to herein for convenience in discussing a preferred illustrative embodiment of the invention, the latter should nevertheless be understood as also applicable to the wrapping of generally cylindrical bales which might be produced in a fixed bale forming machine of the material rotating type, as to which the material to be baled would be brought to the machine, rather than vice versa as is more common in the agricultural field.

THE METHOD

The method of this invention and the improved bale product produced thereby may be most readily explained with reference to FIG. 2 and limited initial reference also to the rightmost portion of FIG. 3. In the latter, a typical twine guide is depicted at 30 and is of generally L-shaped, tubular configuration having an upright, rotatable twine receiving leg 32 and a laterally extending, twine directing and dispensing leg 34. A supply of twine, such as a container or rotatable reel, is depicted at 36, from which twine 38 is fed to the upper, open extremity of the receiving leg 32 of the guide 30. A free stretch of twine 40, remaining from the cutting of the twine adjacent the last wrapped bale, hangs from the open extremity of the directing leg 34 and is adapted to be fed from the latter under appropriate tension when the next bale is to be wrapped. Some suitable driving means 50, which in the preferred apparatus of the invention is a reversible, direct current electric motor, is operably coupled in any suitable fashion, as indicated by the dotted line 52, with the rotatable leg 32 of the twine guide 30, so that the latter may be rotatably oscillated during a bale wrapping cycle to move the twine directing orientation of the discharge extremity of the dispensing leg 34 from a standby position toward the "home" end of a rotating bale to be wrapped to a fully actuated position toward the opposite "remote" end of such bale. It will be appreciated, of course, that the movement of the twine guide 30 or the stopping of such movement at any point along its path of travel depends upon and may be controlled merely by energization or deenergization of the motor 50 and, further, that the direction of movement of the guide 30 relative to the bale depends upon and may be controlled merely by the electrical polarity of the energization applied to the motor 50.

In the method of the invention, as a bale is being rotated and fed with additional material to accumulate to the required size, the twine guide 30 will be in a standby position in which the hanging twine stretch 40 from the open extremity of the guide leg 34 is disposed sufficiently away from the rotating hay as not to be "picked up" by the latter. When the bale attains the desired size, the operator stops the baler from further movement through the field from which the hay is being gathered (if the baler is of the mobile type), but permits the hay mass constituting the newly formed bale to continue to be rotated by the baler. As will be made clear from later discussion of the apparatus of the invention, the operator then need only manually initiate the wrapping cycle of operation by momentary closure of an electric switch, whereupon the operating cycle will automatically proceed to conclusion, in readiness for discharge from the baler of the bale in finished, wrapped condition. As will also be made clear from discussion of the apparatus, the necessary movements and interruption of movement of the twine guide 30 required for practice of the invention is accomplished by the electrical control circuitry portion of such apparatus through successive, time-referenced energizations and deenergizations of the motor 50 and appropriate automatic selection of the electrical polarity of such energizations during predetermined, successive periods of time correlated with the speed at which the bale is being rotated. From the standpoint of the method involved, however, it is initially germane to consider primarily the manner in which the twine is directed toward the bale to be wrapped, with particular emphasis upon the shifting thereof relative to the length of the bale and the significant time relationships intimately correlated therewith.

Accordingly, and now turning greater attention to FIG. 2, the bale to be wrapped is generally designated 60, and the twine with which it is to be wrapped is generally designated 62. The twine guide 30 is first moved in one continuous and uninterrupted motion and at a substantially constant rate from its standby position to its fully actuated position, with the extent of such movement being determined with reference to the length of the bale 60 formed by the particular baler involved, the rate at which the twine guide 30 will be moved, and the predetermined period of time required for the twine guide 30 to complete such initial continuous movement from its standby position to its fully actuated position. During such initial movement, the hanging stretch 40, which will constitute the initiating distal end portion of the wrapping, is carried closer to the rotating bale 60 as the discharging extremity of the twine guide leg 34 approaches the mid-point of the length of the bale 60, so that the twine stretch 40 will be "picked up" by the rotating hay mass of the bale 60 and usually become somewhat embedded in the latter at a point around or, as illustrated, somewhat beyond the mid-point between the "home" end 64 and the "remote" end 66 of the bale 60. Once the distal stretch 40 of the twine 62 has been "picked up" by the bale 60, the continuing movement of the twine guide 30 toward the "remote" end 66 of the bale will cause spiralled convolutions 68 of the twine 62 to be laid upon the bale 60 in the direction indicated in the drawing. When the time period for such initial motion of the twine guide 30 from end 64 to end 66 of the bale 60 has expired, the twine guide 30 will remain motionless with respect to the bale 60 for an appropriate succeeding period of time required to wrap a plurality of circumferential convolutions 70 upon a relatively narrow circumferential zone of the bale 60 adjacent the "remote" end 66 thereof. Such time period for applying the circumferential convolutions 70 is, of course, predeterminable directly from the speed at which the bale 60 is being rotated and the number of convolutions 70 which it is desired to apply to that particular circumferential zone of the bale 60 (about 3 of such circumferential convolutions 70 having been found satisfactory with typical baleable materials), with any additional strength being available through appropriately chosen spacing between the successive circumferential zones of the bale 60 to which a plurality of adjacent, circumferential convolutions 70 will be applied, as hereinafter mentioned. At the conclusion of the predetermined period of time required for application of the convolutions 70 to the narrow circumferential zone of the bale 60 nearest the "remote" end 66 thereof, the twine guide 30 will be moved in the opposite direction back toward the "home" end 64 of the bale 60 during a relatively short, next period of time, during which a convolution (or part thereof) 72 will be laid in spiralled disposition upon the bale 60 to a point along the length of the latter at which a second circumferential zone is located upon which a second plurality of circumferential convolutions 70 are to be wound. At the expiration of such relatively short period of time for laying the spiralled convolution 72, the motion of the twine guide 30 is again stopped and the second set of circumferential convolutions 70 are wound upon the bale 60 during a corresponding predetermined period of time required for that purpose and essentially determined by the number of convolutions to be wound and the substantially constant rate at which the bale 60 is being rotated. Thereafter, the intermittent movement and alternate holding of the twine guide 30 in particular intermediate positions thereof along the bale 60 continues in the same fashion to alternately wind upon the bale further spiralled convolutions 72 and further sets of circumferential convolutions 70 until the "home" end 64 of the bale 60 is approached and wrapped with a set of circumferential convolutions 70, whereupon, as the twine guide 30 commences to move still further toward the "remote" end 64 of the bale 60, the twine 62 will be cut to leave a short, loose, end stretch thereof as at 74, and, at the conclusion of the corresponding time period, the twine guide 30 will have been returned to its standby position adjacent the end 64 of the bale 60, with a new distal stretch 40 hanging from the twine dispensing leg 34, and the operational cycle for wrapping of the bale 60 will have been concluded so that the bale 60 is ready for discharge from the baler. After such conclusion of the last step of the operating cycle, the twine guide 30 will, of course, remain motionless in its standby position until the next cycle for wrapping a succeeding bale 60 is initiated by the operator.

It will be apparent, therefore, that the essence of the improved method of the invention and the improved wrapping pattern and bale product produced thereby are intimately related to the manner in which the successive steps of the method involving shifting or nonshifting of the point at which the twine 62 is being directed to the bale 60 are carried out in time-referenced correlation with the size of the bale 60 and the rate at which it is being rotated, that is, with each successive step being performed during and controlled by its own respective, predetermined time period.

THE APPARATUS

It should initially be noted, before considering the remaining control portions of the apparatus, that only those components and connections relevant to this invention are shown in the drawings and need be herein described. Those skilled in the art will readily appreciate, however, that additional components and functions, such as various indicators, may readily be added to the overall electric system of a baler provided with the apparatus of this invention, in order to, say, utilize the same timing signals as already provided by the apparatus for practicing the invention for some other related or unrelated purpose.

Figure 3:
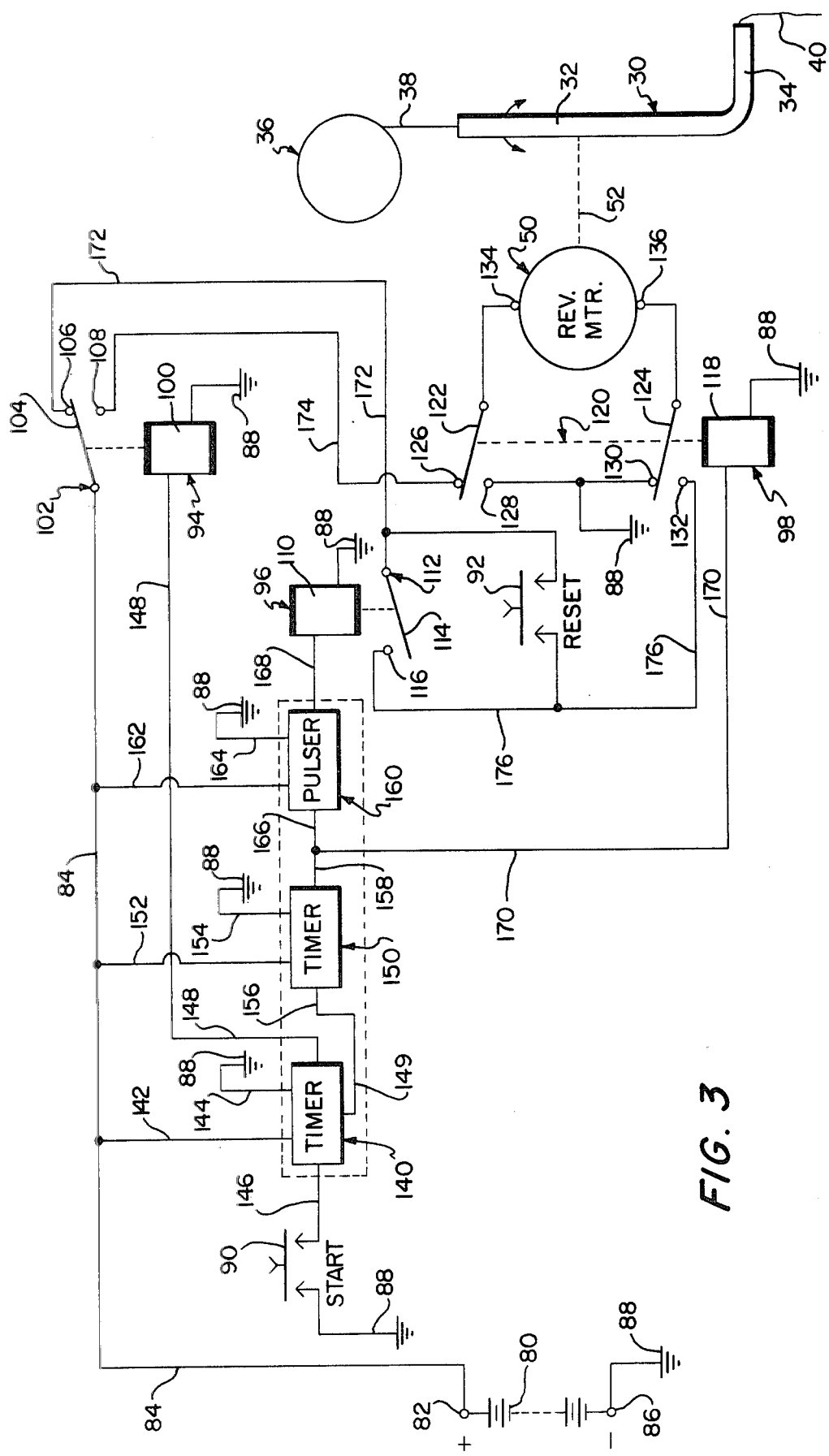
FIG. 3 is a diagramatic depiction, partly schematic and partially in block form, of the improved bale wrapping apparatus of the invention.

Referring now to FIG. 3, the components and connections involved in the electrical control circuitry of the apparatus will first be identified, and the operation thereof then discussed, the primary mechanical components of the apparatus having already been identified and their purpose and operation with respect to this invention essentially explained.

A direct current power source 80, such as a storage battery, has its positive terminal 82 connected with a positive bus 84 and its negative terminal 86 connected with a common ground (or bus, if preferred) 88. The only manual control components are a normally open, start switch 90 and an optional, normally open, reset switch 92, both of which may be located for the convenience of the baler operator. Three relays 94, 96 and 98 are provided; the relay 94 has an operating coil 100, of which one side is connected with the common ground 88, and a single pore, double throw switch 102 having a pole piece 104 whose positioning is controlled by the energization state of the coil 100, a contact 106 engaged by the pole piece 104 when the coil 100 is deenergized, and a contact 108 engaged by the pole piece 104 when the coil 100 is energized; the relay 96 has an operating coil 110, of which one side is connected with the common ground 88, and a single pole, single throw switch 112 having a pole piece 114 and a contact 116 which is engaged by the pole piece 114 only when the coil 110 is energized; the relay 98 has an operating coil 118, of which one side is connected with the common ground 88, and a double pole, double throw switch 120 having a pair of pole pieces 122 and 124, a pair of contacts 126 and 128 associated with the pole piece 122, and a pair of contacts 130 and 132 associated with the pole piece 124, the pole pieces 122 and 124 respectively engaging the contacts 126 and 130 when the coil 118 is deenergized and the contacts 128 and 132 when the coil 118 is energized; as will be apparent to those skilled in the electrical arts, the relays 94, 96 and 98 could be replaced with equivalent solid state or other electronic switching component arrangements, but relay components are economical and preferred, especially for those parts of the circuitry which must handle the currents drawn by the motor 50. The motor 50 is of the direct current, reversible type and has a pair of power input terminals 134 and 136.

The remaining primary components of the control circuitry of the apparatus of the invention are preferably implemented with conventional functional modules commercially available "off-the-shelf" in integrated circuit form, are well known to those skilled in the electronic arts, and are, therefore, illustrated merely in block diagram form in the drawings with only the principal connections thereto relevant to the invention being shown. Those skilled in the electronic arts will also understand that the circuitry will conventionally employ capacitances where appropriate for bypassing transients and resistances for deriving appropriate operating voltages, as well as resistance-capacitance combinations of suitably selected or adjustable values to establish needed time constants for the functional modules; to whatever extent such conventional incidents of the circuitry are not already internally incorporated into the particular functional module components employed in a particular implementation of the apparatus, they will, of course, need to be provided in discrete component form, although for purposes of clarity as to the primary elements of the circuitry such mundane details of implementation are not shown in the drawings and need not be further described to those skilled in the art.

The first two of such functional modules 140 and 150 are timers (in effect, electrically timed electronic switches), which may both be implemented with a single integrated circuit device, such as the SE556 or NE556 type dual precision timers available commercially from Texas Instruments, Incorporated or Signetics Corporation, in which each of the modules 140 and 150 utilizes one-half of the integrated circuit device. The third such functional module 160 is a pulser or multivibrator (in effect, a generator of a timed sequence of electrical pulses), which may be implemented with an integrated circuit device such as the SE555 or NE555 type precision timers available commercially from Texas Instruments, Incorporated or Signetics Corporation.

The positive bus 84 is connected with the pole piece 104 of the relay switch 102 and with operating voltage leads 142, 152 and 162 of the modules 140, 150 and 160 respectively. The modules 140, 150 and 160 are also provided with leads 144, 154, and 164 respectively connected with the common ground 88. The modules 140, 150 and 160 are further provided with enabling input or trigger leads 146, 156 and 166 respectively and with primary output leads 148, 158 and 168 respectively, and the module 140 also has a secondary output lead 149. It should be noted that interconnected secondary output lead 149 of the module 140 and enabling input lead 156 of the module 150 may be internal to the integrated circuit when both of such modules are implemented with a single, dual timer integrated circuit. The primary output lead 148 of the module 140 is connected with the oppositely ground coil 100 of the relay 94. The primary output lead 158 of the module 150 is connected with the enabling input lead 166 of the module 160 and also, via a lead 170, with the oppositely grounded coil 118 of the relay 98. The primary output lead 168 of the module 160 is connected with the oppositely grounded coil 110 of the relay 96. Contact 106 of relay switch 102 is connected with the pole piece 114 of the relay switch 112 by a lead 172. Contact 108 of relay switch 102 is connected with contact 126 of the relay switch 120 by a lead 174. Contact 116 of relay switch 112 is connected with contact 132 of relay switch 120 by a lead 176. Contacts 128 and 130 are connected with the common ground 88. If provided, the reset switch 92 is coupled between leads 172 and 176 in shunt with the relay switch 112. The power terminals 134 and 136 of the motor 50 to be controlled are connected with the pole pieces 122 and 124 respectively of the relay switch 120, and, "at the other end", the enabling input lead 146 of the first time module 140 is connected with one side of the normally open, start switch 90, the other side of the latter being shown as connected with the common ground 88 (as is appropriate when the module 140 is implemented with the particular integrated circuit device suggested above, although those skilled in the art will appreciate that implementation of the module 140 with a functionally equivalent but different integrated circuit device might require that the enabling input connection for the lead 146 through the switch 90 should be with the positive bus 84 rather than the common ground 88).

As illustrated in FIG. 3, the apparatus is depicted in its condition between wrapping cycles, with the motor 50 deenergized.

The operation of the apparatus, commencing with the momentary manual closing of the start switch 90 by the baler operator, and recalling that the twine guide 30 is in its standby position directed toward the "home" end 64 of the bale 60, is essentially as follows:

Closure of the switch 90 to connect the enabling input lead 146 of the first timing module 140 with ground 88 triggers a timing cycle of that module. During that timing cycle, the timer module 140 does two things: first, the module 140 applies a positive potential to its primary output lead 148, and thereby to the coil 100 of the relay 94 to energize the latter, and maintains that condition during an initial predetermined period of time required for movement of the twine guide 30 from its standby position adjacent the "home" end 64 of the bale 60 to its fully actuated position adjacent the "remote" end 66 of the bale 60 (as determined for a particular length of the bale 60 and rate at which the twine guide 30 will be moved by the motor 50), after which initial period the module 140 removes such positive potential from its output lead 148 to deenergize the relay 94; and secondly, at the end of such initial time period, the module 140 applies a positive potential to its secondary output lead 149, and thereby via enabling input lead 156 to trigger the second timer module 150.

As soon as the relay 94 is energized at the beginning of the wrapping cycle by the first timer module 140, the relay switch 102 is actuated to place its pole piece 104 in engagement with its contact 108, thereby energizing the motor 50 to run in a direction to move the twine guide 30 from its standby position to its actuated position in one continuous motion, it being noted that, in this condition, the motor 50 is being energized with a polarity applying the positive potential from the bus 84 to the motor terminal 134, while the motor terminal 136 is grounded. The path of such energization of the motor 50 may be traced from the bus 84, through actuated relay switch 102, the lead 174 portion 126, 122 of the relay switch 120, to the motor terminal 134, through the motor 50 and from terminal 136 thereof and portion 124, 130 of the relay switch 120 to the common ground 88. During this initial period of the wrapping cycle, the dangling twine switch is "picked up" by the bale 60 and the spiralled convolutions 68 are applied to a portion of the latter, as previously described in explaining the method of the invention.

As such initial period of the cycle expires, the twine guide is arriving at its fully actuated position adjacent the "remote" end 66 of the bale 60, and the first timer module 140 applies a triggering input to the lead 156 of the second timer module 150 to activate the timing cycle of the latter. When the timing cycle of the second timer module 150 is thus activated, it applies a positive potential to its output lead 158, and thereby both to the enabling input lead 166 of the pulser module 160 and, via the lead 170 to the coil 118 of the relay 98 to energize the latter, and maintains that condition during the remainder of the period constituting the full bale wrapping cycle, after which it removes such positive potential from its output lead 158 to both remove the enabling input from the pulser module 160 and deenergize the relay 98.

When the pulser module 160 is thus enabled by the second timer module 150, which condition then continues to the end of the wrapping cycle, the module 160 commences and continues to generate and apply to its output lead 168 a series of spaced electrical pulses of positive potential and predetermined duration both as to the length of such pulses and the spacing therebetween. Such pulsed output from lead 168 of the pulser module 160 is applied to the coil 110 of the relay 96 to thereby alternate the condition of the relay switch 112 between open and closed states thereof. The energization of the relay 98 by the second timer module 150 essentially concurrently with the initiation of the pulsing actuation of the relay switch 112 causes the motor 50 to be alternately energized with reversed polarity and deenergized, each for respectively predetermined periods of time during the remainder of the wrapping cycle. During the transition of states until the polarity reversing relay switch 120 has actuated in response to energization of its operating coil 118 and the relay switch 102 has returned to the condition shown in FIG. 3 following deenergization of its operating coil 100, the twine guide 30 will remain in its fully actuated position adjacent the "remote" end 66 of the bale 60 and the first set of circumferential convolutions 70 will be wound upon the bale 60 adjacent its end 66. Then, upon and during the first closing of the relay switch 122, the motor 50 will be energized for a relatively short predetermined period of time to move the twine guide 30 a predetermined distance toward the "home" end 64 of the bale 60, which applied the first of the convolutions 68 spiralled in the direction to the bale 60. Then, when the relay switch 112 reopens and during the predetermined period of time that it remains open as established by the time spacing between the pulses generated by the pulser module 160 for intermittently energizing the relay 96, the twine guide 30 will stop and dwell in an orientation directed toward the next circumferential zone of the bale 60 for receiving the next set of adjacent circumferential convolutions 70, and such next set of convolutions 70 will be wound onto the bale 60. The predetermined period of time of duration of the pulses from the module 160 and corresponding applications of spiralled convolutions 68 and the predetermined periods of spacing between such pulses and corresponding applications of circumferential convolutions 70 will be chosen to provide the desired number of sets of convolutions 70 along the bale 60 and the desired number of convolutions 70 in each such set, taking into account the length and rate of rotation of the bale 60.

This succession of steps, involving alternate periods during which the relay switch 112 is closed to energize the motor 50 to move the twine guide 30 further toward the "home" end 64 of the bale 60 while applying a spiralled convolution 68 to the latter and periods during which the relay switch 112 is opened to deenergize the motor 50 and cause the twine guide 30 to stop and dwell during the winding of another set of circumferential convolutions 70 onto the bale 60, is continued until the predetermined period of time established for the entire wrapping cycle has expired, as marked by the cessation of the outputs from the second timer module 150 and the pulser module 160. At that time, the twine guide 30 will also have arrived back at its standby position adjacent the "home" end 64 of the bale 60, the twine 62 will have been cut off at the stretch 74, the wrapping of the bale 60 will have been completed, and the control circuitry of the apparatus will have been restored to the "between cycles" condition illustrated in FIG. 3.

The purpose of the optional reset switch 92 is to permit the baler operator to abort a wrapping cycle before completion, if there should be any reason for doing so. Manual closure of the reset switch 92 in effect shunts across the relay switch 112 so as to terminate the alternate periods of advancement and dwell of the twine guide 30 and permit the operator to energize the motor continuously until the twine guide 30 is returned to its "home" position.

It is believed apparent that various modifications could be made in either the method or apparatus aspects of the invention from the preferred forms thereof disclosed herein for illustration, without departing from the gist and essence of the invention. Accordingly, the invention should be construed to encompass the fair scope of subject matter hereinafter claimed and mechanical equivalents thereof.

We claim:

1. For use in combination with a baler machine for forming hay into a generally cylindrical bale of the type having means for supporting and rotating the bale and means for supplying and feeding a filament to be wrapped upon at least portions of the bale as the latter is rotated, improved means for controlling the application and pattern of filament wrapped upon the bale including:

shiftable means for guiding a wrapping filament toward various locations along the axial dimension of a bale during rotation thereof, said guiding means having a first position adjacent one extremity of the bale and a second position adjacent the other extremity of the bale and being movable in either direction therebetween through a number of intermediate positions;

drive means operably coupled with said guiding means for moving the latter in either direction when said drive means is operated in a corresponding direction; and control means operably coupled with said drive means and operable when actuated for causing said drive means to move said guiding means from said first position to said second position in a single continuous motion during a first predetermined period of time, then to automatically move said guiding means from said second position to said first position in a series of successive motions each of a second predetermined period of time separated by dwells each of a third predetermined period of time at each of a plurality of said intermediate positions, said control means including a main, manually operable actuator device adapted for initial manipulation and release by the operator of the baler machine to start a wrapping cycle consisting of one complete, reciprocatory movement of said guiding means to and from said first position, components responsive to said initial manipulation of the actuator device to actuate said drive means, and means coupled with said components for maintaining the same in a condition actuating said drive means in a manner to move said guide means through a complete wrapping cycle notwithstanding release of the actuator device by the operator throughout the wrapping cycle.

2. Apparatus as set forth in claim 1, wherein:

said drive means comprises a reversible, direct current, electrical motor having an energizing circuit.

3. For use in combination with a baler machine for forming hay into a generally cylindrical bale of the type having means for supporting and rotating the bale and means for supplying and feeding a filament to be wrapped upon at least portions of the bale as the latter is rotated, improved means for controlling the application and pattern of filament wrapped upon the bale including:

shiftable means for guiding a wrapping filament toward various locations along the axial dimension of a bale during rotation thereof, said guiding means having a first position adjacent one extremity of the bale and a second position adjacent the other extremity of the bale and being movable in either direction therebetween through a number of intermediate positions;

drive means operably coupled with said guiding means for moving the latter in either direction when said drive means is operated in a corresponding direction; and control means operably coupled with said drive means and operable when actuated for causing said drive means to move said guiding means from said first position to said second position in a single continuous motion during a first predetermined period of time, then to move said guiding means from said second position to said first position in a series of successive motions each of a second predetermined period of time separated by dwells each of a third predetermined period of time at each of a plurality of said intermediate positions, said drive means comprising a reversible, direct current, electrical motor having an energizing circuit, said control means including switching means for reversing the polarity of electrical operating power supplied to said energizing circuit for said motor, and first time-referenced means operably coupled with said switching means for reversing the polarity of electrical operating power applied to said energizing circuit for said motor during said second and third predetermined periods from the polarity thereof during said first predetermined period.

4. Apparatus as set forth in claim 3, wherein:

said control means further includes second time-referenced means operably coupled with said energizing circuit for said motor for enabling said motor to be operated during said second and third predetermined periods, and third time-referenced means operably coupled with said energizing circuit for said motor for disabling said motor from operating during said third predetermined periods.

5. Apparatus as set forth in claim 4, wherein:

said second time-referenced means generates a pulsed electrical output with the successive pulses thereof spaced apart by said third predetermined periods.

6. Apparatus as set forth in claim 5, wherein:

the sum of said second and third predetermined periods is greater than said first predetermined periods.

* * * * *